United States Patent Office 3,394,092
Patented July 23, 1968

3,394,092
PROCESS FOR PRODUCTION OF POLYOXYMETH-YLENES IN THE PRESENCE OF LECITHIN AS AN INITIATOR
Robert Alton Setterquist, Vienna, W. Va., assignor to E. I. du Pont de Nemours and Company, Wilmington, Del., a corporation of Delaware
No Drawing. Filed Mar. 29, 1966, Ser. No. 538,211
12 Claims. (Cl. 260—18)

This invention relates to polymers and their preparation, and, more particularly, it relates to the preparation of polyoxymethylenes.

Those materials which function as initiators of the polymerization of formaldehyde are quite sensitive to the amount of impurities in the formaldehyde monomer employed. Such impurities are formic acid, water, and methanol. The sensitivity of the initiator to impurities is manifested by the fact that the molecular weight of polyoxymethylene formed is diminished to a degree dependent upon the purity of the formaldehyde monomer.

The process of this invention provides a method for producing high molecular weight polyoxymethylene by employing as a polymerization initiator a material which is relatively insensitive to impurities such as those mentioned above. Moreover, when purified formaldehyde monomer is employed in the presence of the initiator used in this invention, a polymer of high molecular weight is obtained. Of course, a comonomer can be employed in the process of this invention to form a polyoxymethylene copolymer.

The process of this invention comprises introducing gaseous formaldehyde monomer into an agitated hydrocarbon medium inert to formaldehyde, the medium containing 3–10 carbon atoms, at a reaction temperature of up to +100° C., in the presence of lecithin as an initiator. The polymer is then separated from the mixture.

Lecithin is an inexpensive, naturally-occurring phosphatide. The lecithin useful in this process can be derived from animal or vegetable sources. The most common source of lecithin is "lecithin from vegetable."

The media employed in the process of this invention can be any of the hydrocarbons of 3–10 carbon atoms which is inert to both monomer and the polymer, and which does not excessively deactivate the initiator. Preferred solvents are heptane, cyclohexane, and toluene.

The amount of initiator employed can be varied widely. Generally, about 0.0001–0.3 part (by weight) of lecithin per 100 parts of medium can be employed. It is preferred that there be 0.001–0.30 part of lecithin per 100 parts of medium.

The reaction time and temperature are interdependent. The reaction temperature can vary up to 100° C. The lower limit of the reaction temperature is near the freezing point of the medium employed. The preferred temperature range is 0–100° C. The optimum temperature is in the range 10–60° C.

The time of the reaction can be as long as necessary to reach a reasonable degree of reaction at a given temperature, and is dependent upon a number of factors including concentration of initiator and purity of monomer.

In general, the process is carried out by passing a stream of gaseous formaldehyde into a stirred solution of the initiator in the hydrocarbon medium. To obtain a polyoxymethylene of exceptionally high molecular weight, the formaldehyde should be purified prior to admission to the reaction vessel. A convenient method of purification of the formaldehyde monomer is the passage of the impure monomer through one or more condensation traps at temperatures below 0° C. (preferably at about −18° C.) to reduce the amount of impurities therein (cyclohexanol, water, formic acid, methanol).

When the process of this invention is employed to produce polyoxymethylene copolymers, there can be up to 10% of said comonomer in the hydrocarbon medium.

Comonomers useful in the present invention can be selected from the class consisting of aldehydes of 2–8 carbon atoms, isocyanates of 2–10 carbon atoms, and lactones of 3–5 carbon atoms.

Illustrative of useful comonomers are acetaldehyde, propionaldehyde, acrolein, crotonaldehyde, valeraldehyde, benzaldehyde, furfural, ethyl isocyanate, butyl isocyanate, phenyl isocyanate, octyl isocyanate, para-methoxyphenyl isocyanate, $\beta$-propiolactone, $\gamma$-butyrolactone, and $\gamma$-valerolactone.

It will be readily recognized by those skilled in the art that the process of this invention can be conducted as a continuous as well as a batch process. Such a continuous process can, for example, employ a spray reactor as described in U.S. Patent 3,172,736, issued to R. E. Gee et al. on Mar. 9, 1965.

In order that the invention may be better understood the following detailed examples are given in addition to the examples already given above. Inherent viscosities referred to in the examples are measured at 90° C. upon a solution of 0.5 gram of polymer in 100 ml. of phenol. The formula for inherent viscosity is that reported in N. Brown and E. T. Cline, U.S. Patent 3,076,786, granted Feb. 5, 1963. All percentages and parts are by weight unless otherwise indicated.

EXAMPLE I

Formaldehyde was generated by pyrolysis of cyclohexylhemiformal at 150° C. The product vapors were directed through a condenser (to remove cyclohexanol), then through two U-tubes, each approximately 1 inch in diameter by 12 inches in height, the first being held at 25° C., the second packed with stainless steel and held at −16 to −18° C. The U-tubes removed large amounts of water, formic acid, methanol, and cyclohexanol.

The purified formaldehyde vapor was then passed (at a rate of about one part per minute) in to a 300-ml. reactor containing 100 parts of toluene and equipped with a magnetic stirring bar. The reaction temperature was 40° C. After the toluene had been saturated with formaldehyde (about one minute), 0.003 part of lecithin (Fisher Scientific Company "lecithin from vegetable") was added. After formaldehyde had been passed through the liquid during an induction period of about 8 minutes, polymerization ensued vigorously. Formaldehyde introduction was continued for about 10 minutes after the completion of the induction period. The crude polyoxymethylene was recovered by filtration, washed five times with 100 parts of acetone, and dried overnight at 70° C. in a vacuum oven to yield 8.2 parts of crude product.

The crude polymer was stabilized by forming the propionate diester: 1 part of crude product, 25 parts of propionic anhydride, and 1 part of quinoline were mixed at room temperature. The mixture was then sparged with nitrogen for 15 minutes. The mixture was then heated under nitrogen atmosphere for 45 minutes at 165° C. Heating was then discontinued, the product was allowed to precipitate and dried in a vacuum oven at 70° C. for 2 hours. The polyoxymethylene diester thus obtained had an inherent viscosity of 5.59, corresponding to a molecular weight of approximately 460,000.

EXAMPLE II

The polymerization procedure of Example I was used with the following modifications.

Water was added to the reaction medium during the polymerization at a rate of 0.01 part per minute from a 50-microliter syringe; 0.012 part of lecithin were present.

There was recovered 9.9 parts of crude polymer, the propionate diester of which had an inherent viscosity of 1.93, corresponding to a molecular weight of about 100,000.

EXAMPLE III

The polymerization procedure of Example I was employed with the following modifications.

Both U-tubes were maintained at 25° C. Therefore substantial amounts of impurities were allowed to pass into the reaction medium. The temperature of the reaction medium was maintained at 25° C. There was recovered 9.6 parts of crude polymer, the propionate diester of which had an inherent viscosity of 1.97, corresponding to a molecular weight of about 100,000.

EXAMPLE IV

The polymerization procedure of Example I was employed with the following modifications.

The gaseous formaldehyde was purified by passage through nine U-tubes held at −16 to −18° C. The reactor contained 200 parts of cyclohexane (as the medium) and 0.036 part of lecithin. The reaction temperature was 25° C. Formaldehyde was passed through the reaction vessel for 30 minutes. There was recovered 6.6 parts of crude polymer, the propionate diester of which had an inherent viscosity of 5.8. This corresponds to a molecular weight of about 480,000.

EXAMPLE V

Formaldehyde was anionically copolymerized with acrolein according to the procedure of Example I, as modified below.

Formaldehyde was purified by passage through a U-tube at 25° C. and three U-tubes at −18° C. The purified formaldehyde was then passed into a 300-ml. reactor containing 95 parts of cyclohexane and 5 parts of acrolein. After 3 minutes, 0.0128 part of lecithin was added. The reaction mixture was agitated and the temperature was maintained at 40° C. After 20 minutes, the crude copolymer was recovered by filtration, washed with 100 parts of methanol, and dried at 40° C. for 2 days in vacumm to yield 6.0 parts of crude copolymer. The crude polymer was stabilized by forming the propionate diester.

The propionate diester had an inherent viscosity of 2.65 and melted 4° C. lower than a polyoxymethylene homopolymer of the same inherent viscosity.

EXAMPLE VI

Formaldehyde was anionically copolymerized with crotonaldehyde according to the procedure of Example V.

The yield of crude copolymer was 3.1 parts. The propionate diester thereof had an inherent viscosity of 2.02 and melted 5° C. lower than a polyoxymethylene homopolymer of the same inherent viscosity.

EXAMPLE VII

Formaldehyde was anionically copolymerized with para-methoxyphenyl isocyanate according to the procedure of Example V.

The yield of crude copolymer was 1.0 part. The propionate diester thereof had an inherent viscosity of 3.32 and melted 6° C. lower than a polyoxymethylene homopolymer of the same inherent viscosity.

EXAMPLE VIII

Formaldehyde was anionically copolymerized with γ-butyrolactone according to the procedure of Example V.

The yield of crude copolymer was 2.6 parts. The propionate diester had an inherent viscosity of 2.92 and melted 5° C. lower than a polyoxymethylene homopolymer of the same inherent viscosity.

In Examples I and IV, low-temperature condensation (at about −18° C.) was employed to remove substantial amounts of impurities such as formic acid, methanol, and water. The polymer resulting from this process using formaldehyde of high purity had a molecular weight of over 450,000. In Example III, identical to Example I except that the low-temperature condensation bath was replaced by a 25° C. bath, the molecular weight of the polymer was about 100,000. Thus, this process using the lecithin as an initiator produces polyoxymethylene of good molecular weight even from relatively impure monomer, while with monomer of good purity a polymer of exceptionally high molecular weight is produced. Polyoxymethylenes are useful as molding resins.

The foregoing detailed description has been given for clearness of understanding only, and no unnecessary limitations are to be understood therefrom. The invention is not limited to the exact details shown and described since obvious modifications will occur to those skilled in the art.

I claim:

1. A process for the synthesis of polyoxymethylene from formaldehyde comprising introducing gaseous formaldehyde into an agitated hydrocarbon medium, said hydrocarbon medium containing 3–10 carbon atoms, at a reaction temperature of up to about 100° C., in the presence of lecithin as an initiator.

2. A process according to claim 1 wherein the reaction temperature is 10–60° C. and there is present about 0.0001–0.3 part of lecithin per 100 parts of said hydrocarbon medium.

3. A process according to claim 2 wherein there is present 0.001–0.03 part of lecithin per 100 parts of said hydrocarbon medium.

4. A process according to claim 1 wherein said hydrocarbon is toluene.

5. A process according to claim 1 wherein said hydrocarbon is cyclohexane.

6. A process according to claim 1 wherein said hydrocarbon is heptane.

7. A process for the synthesis of polyoxymethylene copolymers from formaldehyde and a comonomer selected from the class consisting of aldehydes of 2–8 carbon atoms, isocyanates of 2–10 carbon atoms, and lactones of 3–5 carbon atoms, said process comprising introducing gaseous formaldehyde into an agitated solution of up to 10% of said comonomer in a hydrocarbon medium, said hydrocarbon medium containing 3–10 carbon atoms, at a reaction temperature of up to about 100° C., in the presence of lecithin an an initiator.

8. A process according to claim 7 wherein said aldehyde is acrolein.

9. A process according to claim 7 wherein said isocyanate is para-methoxyphenyl isocyanate.

10. A process according to claim 7 wherein said lactone is γ-butyrolactone.

11. A process according to claim 7 wherein the reaction temperature is 10–60° C. and there is present about 0.0001–0.3 part of lecithin per 100 parts of said hydrocarbon medium.

12. A process according to claim 11 wherein said hydrocarbon is cyclohexane.

No references cited.

WILLIAM H. SHORT, *Primary Examiner.*

H. SCHAIN, *Assistant Examiner.*